(12) United States Patent
Lee et al.

(10) Patent No.: US 11,067,215 B2
(45) Date of Patent: Jul. 20, 2021

(54) ADJUSTABLE SUPPORTING FRAME

(71) Applicant: SYNCMOLD ENTERPRISE CORP., New Taipei (TW)

(72) Inventors: Yuan-Chi Lee, New Taipei (TW); Chih-Hsin Chou, New Taipei (TW); Tung-Chiung Chen, New Taipei (TW); Ching-Hui Yen, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 0 days.

(21) Appl. No.: 16/824,975

(22) Filed: Mar. 20, 2020

(65) Prior Publication Data

US 2020/0300407 A1    Sep. 24, 2020

Related U.S. Application Data

(60) Provisional application No. 62/822,402, filed on Mar. 22, 2019.

(51) Int. Cl.
*F16M 11/10* (2006.01)
*A47B 97/00* (2006.01)

(52) U.S. Cl.
CPC ............ *F16M 11/10* (2013.01); *A47B 97/00* (2013.01); *A47B 2097/006* (2013.01)

(58) Field of Classification Search
USPC ..... 248/146, 149, 371, 372.1, 122.1, 123.11, 248/123.2, 917, 918, 919, 923, 920
See application file for complete search history.

(56) References Cited

U.S. PATENT DOCUMENTS

| | | | | |
|---|---|---|---|---|
| 7,597,302 B2* | 10/2009 | Lee | ......................... | F16M 11/08 248/157 |
| 8,205,842 B2* | 6/2012 | Wang | ..................... | F16M 11/10 248/176.3 |
| 8,469,323 B1* | 6/2013 | Deros | .................. | F16M 13/022 248/278.1 |
| 8,596,599 B1* | 12/2013 | Carson | ................. | F16M 11/041 248/429 |
| 2003/0075653 A1* | 4/2003 | Li | ........................... | F16M 11/24 248/274.1 |
| 2010/0059648 A1* | 3/2010 | Zhang | ................... | F16M 11/105 248/371 |
| 2013/0134267 A1* | 5/2013 | Liu | ....................... | F16M 11/041 248/122.1 |
| 2014/0029176 A1* | 1/2014 | Chiang | .............. | F16M 11/2092 361/679.01 |
| 2016/0018051 A1* | 1/2016 | Lin | ..................... | F16M 11/2021 248/122.1 |
| 2017/0051865 A1* | 2/2017 | Chen | .................... | F16M 11/046 |
| 2017/0152987 A1* | 6/2017 | Hung | .................. | F16M 11/2014 |
| 2019/0069422 A1* | 2/2019 | Choi | .................... | F16M 11/105 |
| 2019/0195417 A1* | 6/2019 | Kwasniewski | .... | F16M 11/2064 |
| 2020/0015585 A1* | 1/2020 | Ren | ........................ | F16M 11/24 |
| 2020/0409410 A1* | 12/2020 | Kawaguchi | ........... | G06F 1/1605 |

* cited by examiner

*Primary Examiner* — Alfred J Wujciak
(74) *Attorney, Agent, or Firm* — Muncy, Geissler, Olds & Lowe, P.C.

(57) ABSTRACT

An adjustable supporting frame is disclosed for supporting a display. The adjustable supporting frame mainly comprises a base, an upright, a tilting unit, and a rotating unit, wherein the tilting unit pivotally rotates around an axial line of a connecting shaft, and the rotating unit rotates around a virtual axis, the axial line and the virtual axis intersect with each other.

18 Claims, 7 Drawing Sheets

ADJUSTABLE SUPPORTING FRAME

CROSS REFERENCE TO RELATED APPLICATION

This application claims the benefit of U.S. Provisional Application Ser. No. 62/822,402 filed on Mar. 22, 2019. The entirety of the Application is incorporated herein by reference.

BACKGROUND OF THE INVENTION

1. Field of the Invention

The present invention relates to an adjustable supporting frame. More particularly, the present invention relates to an adjustable supporting frame for supporting a display.

2. Description of Related Art

The conventional supporting frame for supporting a display generally includes a base, an upright disposed on the base, and a bearing module disposed on the upright, while the display is disposed on the bearing module. To meet the user's requirements to adjust the tilt angle of the display or to adjust between the landscape position and the portrait position of the display, the bearing module usually includes a rotation unit for converting the landscape position and the portrait position of the display and a tilt unit for adjusting the tilt angle of the display. However, because the rotation unit and tilt unit are physical and space occupying, the rotation axes of the rotation unit and tilt unit do not intersect at a point. Thus, the size of the supporting frame may be huge for including those units so that it does not meet the requirement of thin appearance and also has an unsightly appearance.

SUMMARY OF THE INVENTION

The main object of the present invention is to provide an adjustable supporting frame for supporting a display having a display surface on a wording surface, the supporting frame comprises: a base; a upright including a main column and an extension element and being disposed on the base; a tilting unit being disposed on the extension element and including a connecting shaft, at least one pivoting element, and a fixing plate, wherein the connecting shaft is connected to the extension element, the at least one pivoting element is pivotally fixed to the connecting shaft, and the fixing plate is connected to the pivoting element, the pivoting element and the fixing plate pivotally rotate around an axial line of the connecting shaft; and a rotating unit being rotatably disposed on the fixing plate and including a rotating plate and an engaging hole, wherein the engaging hole is formed on the rotating plate, the rotating plate is rotatably engaged to the fixing plate via the engaging hole, and the rotating plate rotates around a virtual axis, wherein the display is disposed on the rotating plate so that the display is convertible between a landscape position and a portrait position. The display rotates around the axial line for adjusting a tilt angle of the display with respect to the working surface, the fixing plate includes a first surface facing the display and a second surface facing the main column opposite to the first surface, and at least a portion of the connecting shaft is located between the second surface and the display surface of the display.

In one embodiment, the fixing plate includes a main body and an accommodating space, wherein the accommodating space is formed in the main body and penetrated through the main body, the extension element is set on the connecting shaft and passes through the accommodating space, and at least a portion of the at least one pivoting element is disposed in the accommodating space.

In one embodiment, the main body further has a convex part, wherein an outer surface of the convex part is engaged to the engaging hole, the rotating plate is rotatably set on the convex part via the engaging hole, and the virtual axis pass through the accommodating space.

In one embodiment, the outer surface of the convex part is substantially circular shape and the engaging hole is a round hole, wherein the virtual axis passes through a center of the engaging hole.

In one embodiment, the rotating unit further comprises a first rubbing ring, wherein the first rubbing ring is disposed between the rotating plate and the fixing plate and is set on the outer surface of the convex part.

In one embodiment, each of the at least one pivoting element comprises a subject body, a pivot hole, and at least one locking part, wherein the pivot hole is formed on the subject body and is passed through by the connecting shaft, the at least one locking part is formed on at least one of two ends of the main body and fixed to the fixing plate so that the fixing plate pivotally rotates with respect to the connecting shaft via the at least one pivoting element.

In one embodiment, the locking part of each one the at least one pivoting element is accommodated in the accommodating space and is fixed to one side of the convex part adjacent to the upright.

In one embodiment, the adjustable supporting frame further comprises a limiting plate being disposed on the rotating plate and fixed to the fixing plate, wherein the limiting plate includes at least one limiting bump, the rotating plate is disposed between the limiting plate and the fixing plate and rotates with respect to the limiting plate and the fixing plate. The rotating plate further includes a protrusion, wherein the rotating plate is stopped when the protrusion abuts against the at least one limiting bump during the rotation process of the rotating plate.

In one embodiment, the number of the at least one limiting bump is two, the limiting bumps are disposed symmetrically with respect to the virtual axis.

In one embodiment, the rotating unit further includes a second rubbing ring, which is disposed between the rotating plate and the limiting plate.

In one embodiment, the tilting unit further includes at least one torsional spring, at least one screw nut, and at least one gasket set. The at least one torsional spring is set on the connecting shaft with one end fixed to the extension part and another end fixed to the at least one pivoting element, the at least one screw nut is disposed on at least one end of the connecting shaft, while the at least one gasket set is disposed between the at least one torsional spring and the at least one pivoting element and between the at least one pivoting element and the at least one screw nut.

In one embodiment, each of the at least one gasket set includes a cushion gasket, at least one friction gasket, and two hook gaskets, wherein the hook gaskets are disposed on two sides of the at least one pivoting element and pivotally rotate with respect to the connecting shaft along the at least one pivoting element, the at least one friction gasket is disposed between the hook gasket and the at least one torsional spring and fixed to the connecting shaft, and the cushion gasket is disposed between the hook gasket and the at least one screw nut.

In one embodiment, the connecting shaft has two arc sections and two straight sections in a cross-section in a radial direction of the connecting shaft, wherein the straight sections are located between the arc sections, the pivot hole of the at least one pivoting element is circular and the extension part of the upright has a mounting hole, wherein a cross-sectional shape of the mounting hole is the same as a cross-sectional shape of the connecting shaft in the radial direction so that the at least one pivoting element pivotally rotates with respect to the connecting shaft and the connecting shaft is stationary with respect to the extension part when the fixing plate rotates around the axial line.

In one embodiment, the connecting shaft and the at least one pivoting element are disposed in the accommodating space.

In one embodiment, the virtual axis and the axial line of the connecting shaft intersect at a point.

In one embodiment, a rotation center of the rotating plate falls on the axial line of the connecting shaft.

In one embodiment, the tilting unit further includes a back cover being connected to one side of the fixing plate adjacent to the upright, wherein the back cover has a through-hole which is passed through by the upright.

In one embodiment, an integral thickness of the tilting unit, the rotating unit, and the limiting plate is substantially 10 mm to 15 mm.

DETAILED DESCRIPTION OF THE PREFERRED EMBODIMENT

Figure 1:
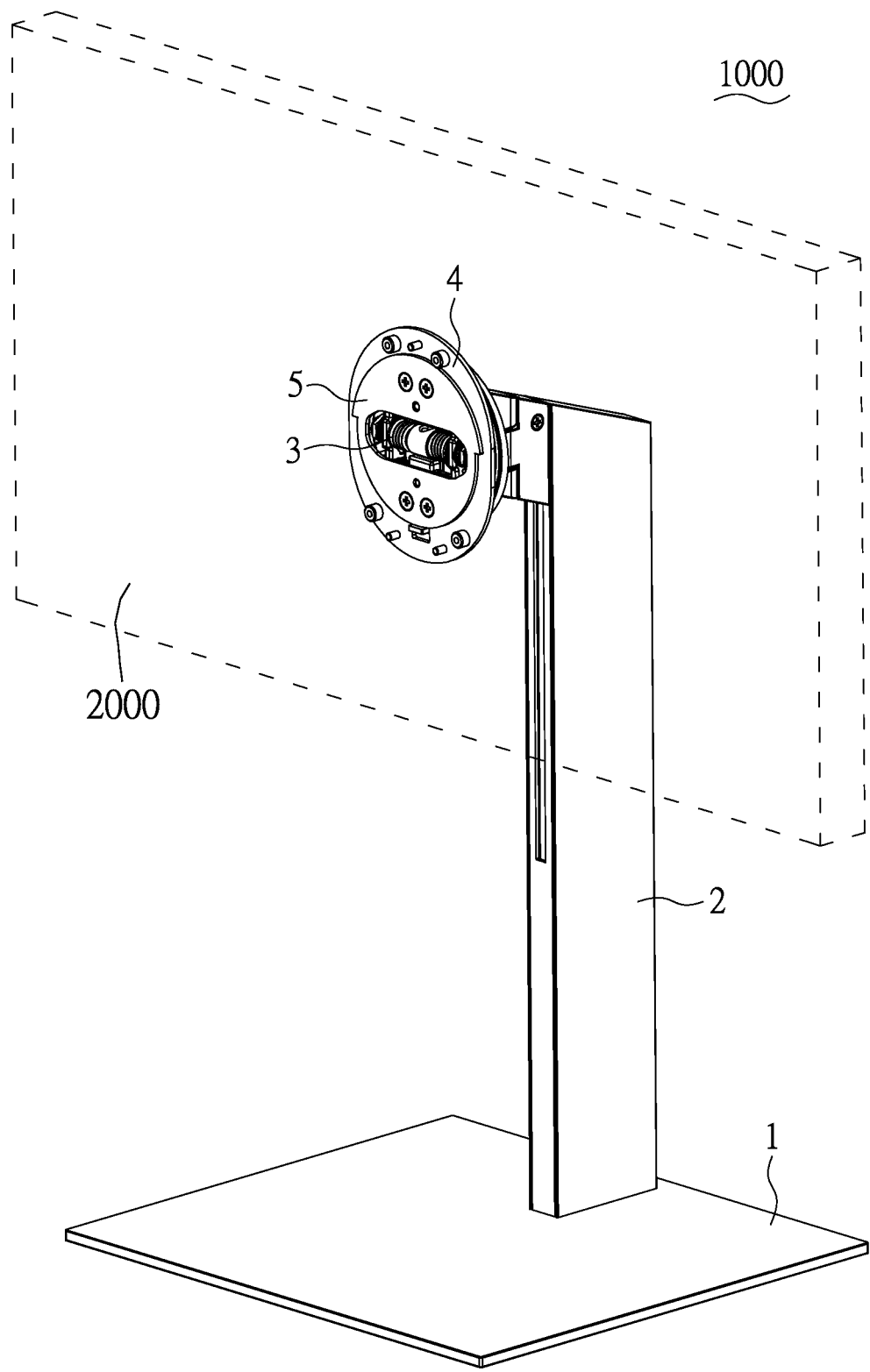
FIG. 1 is a perspective view showing the adjustable supporting frame of one embodiment of the present invention.
Figure 2:
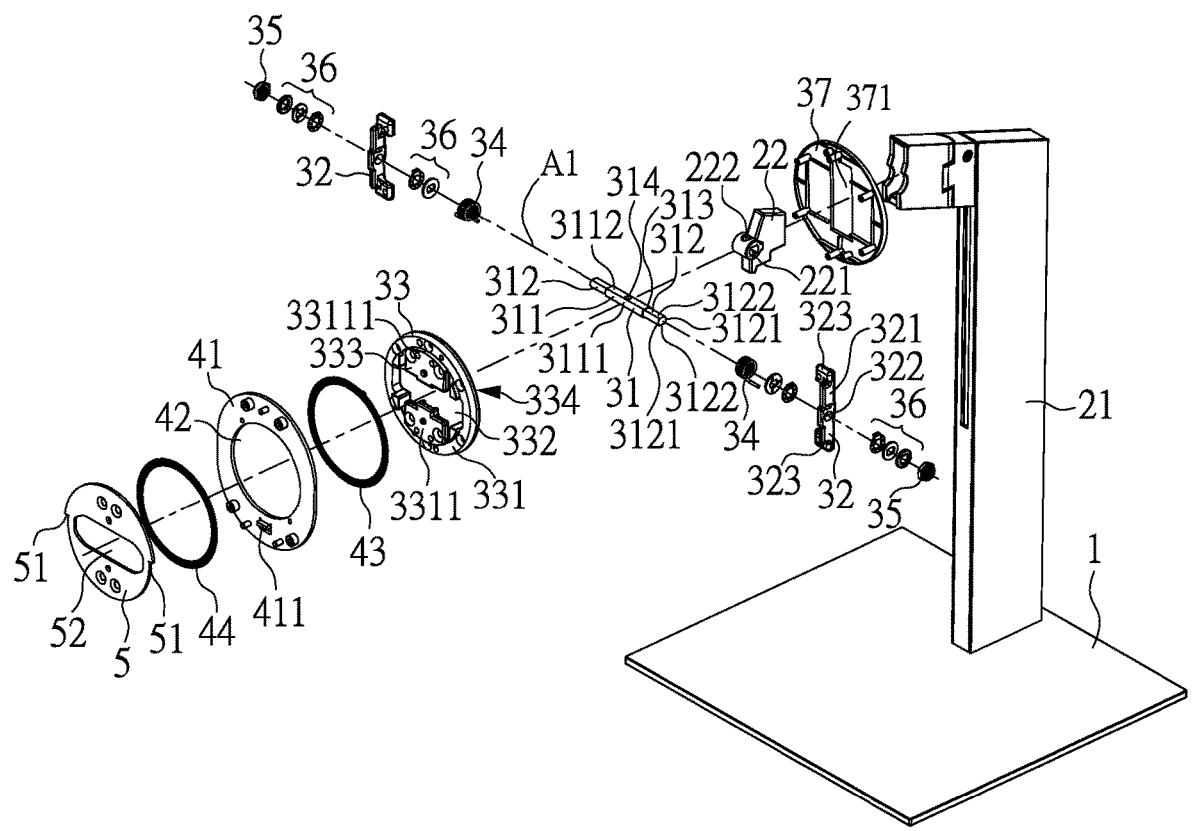
FIG. 2 is an exploded perspective view showing the adjustable supporting frame of one embodiment of the present invention.

Please refer to FIG. 1 and FIG. 2, wherein FIG. 1 illustrates a front perspective view and FIG. 2 illustrates an explosive perspective view of an adjustable supporting frame 1000 of one embodiment of the present invention. The adjustable supporting frame 1000 supports a display 2000 on a wording surface (not shown in figures), such as a desktop, and comprising a base 1, an upright 2, a tilting unit 3, a rotating unit 4, and a limiting plate 5.

The base 1 is disposed on the working surface. The upright 2 is disposed on the base 1 and includes a main column 21 and an extension element 22. The extension element 22 extends from the main column 21 and has a mounting hole 221 and a first locking hole 222.

The tilting unit 3 includes a connecting shaft 31, two pivoting elements 32, a fixing plate 33, two torsional springs 34, two screw nuts 35, two gasket sets 36, and a back cover 37. The connecting shaft 31 passes through the mounting hole 221 of the extension element 22 and has a large-diameter segment 311, two small-diameter segments 312, two abutting parts 313, and a second locking hole 314. The large-diameter segment 311 is disposed between the small-diameter segments 312, and each of the abutting parts 313 is the step difference between the large-diameter segment 311 and each of the small-diameter segments 312 respectively. The second locking hole 314 is aligned with the first locking hole 222 and a locking screw (not shown in figures) passes through the first locking hole 222 and is screwed to the second locking hole 314 for fixing the connecting shaft 31 and the extension element 22.

In addition, the large-diameter segment 311 and the small-diameter segments 312 of the connecting shaft 31 have two arc sections 3111, 3121 and two straight sections 3112, 3122 on a cross-section in a radial direction. The straight sections 3112, 3122 are respectively located between the arc sections 3111, 3121. The cross-sectional shape of the mounting hole 221 is the same as the cross-sectional shape of the large-diameter segment 311 in the radial direction (also has two arc sections and two straight sections). Therefore, when the connecting shaft 31 passes through the mounting hole 221, the connecting shaft 31 and the extension element 22 are interlocked and stay stationary with each other.

Each of the pivoting elements 32 includes a subject body 321, a pivot hole 322, and two locking parts 323. The pivot hole 322 is formed on the subject body 321 and is passed through by the connecting shaft 31. The pivoting elements 32 are rotatably connected on the connecting shaft 31 because the pivot hole 322 is circular. The pivoting elements 32 are capable of pivotally rotating about an axial line A1 of the connecting shaft 31. The locking parts 323 are respectively formed on two ends of the subject body 321 while the fixing plate 33 is fixed thereon. Accordingly, the fixing plate 33 can pivotally rotate about the axis line A1 of the connecting shaft 31 along with the pivoting elements 32.

The fixing plate 33 includes a main body 331, an accommodating space 332, a first surface 333, and a second surface 334. The main body 331 is a round plate and has a convex part 3311. An outer surface 33111 of the convex part 3311 is substantially a circular shape. The accommodating space 332 is formed on the main body 331 and passes through the main body 331. The extension element 22 extends into the accommodating space 332, while the connecting shaft 31 and the pivoting elements 32 are disposed in the accommodating space 332, wherein the locking parts 323 of the pivoting elements 32 are fixed to one side of the convex part 3311 that adjacent to the upright 2, the first surface 333 faces toward the display 2000, and the second surface 334 faces toward the upright 2.

The torsional springs 34 are respectively set on the large-segment 311 of the connecting shaft 31 with one end fixed to the extension element 22 and the other end fixed to the pivoting elements 32. The torsional springs 34 are twisted to generate torsion force when the pivoting elements 32 rotate with respect to the connecting shaft 31. The torsion force, the weight of the display 2000, and the friction forces generated between elements are balanced so that the display 2000 may stop at any tilt angles.

The screw nuts 35 are screwed respectively to the ends of the small-diameter segments 312 of the connecting shaft 31.

The gasket sets 36 are set respectively on the small-diameter segments 312 and are located between the torsional springs 34 and the screw nuts 35.

Figure 3:
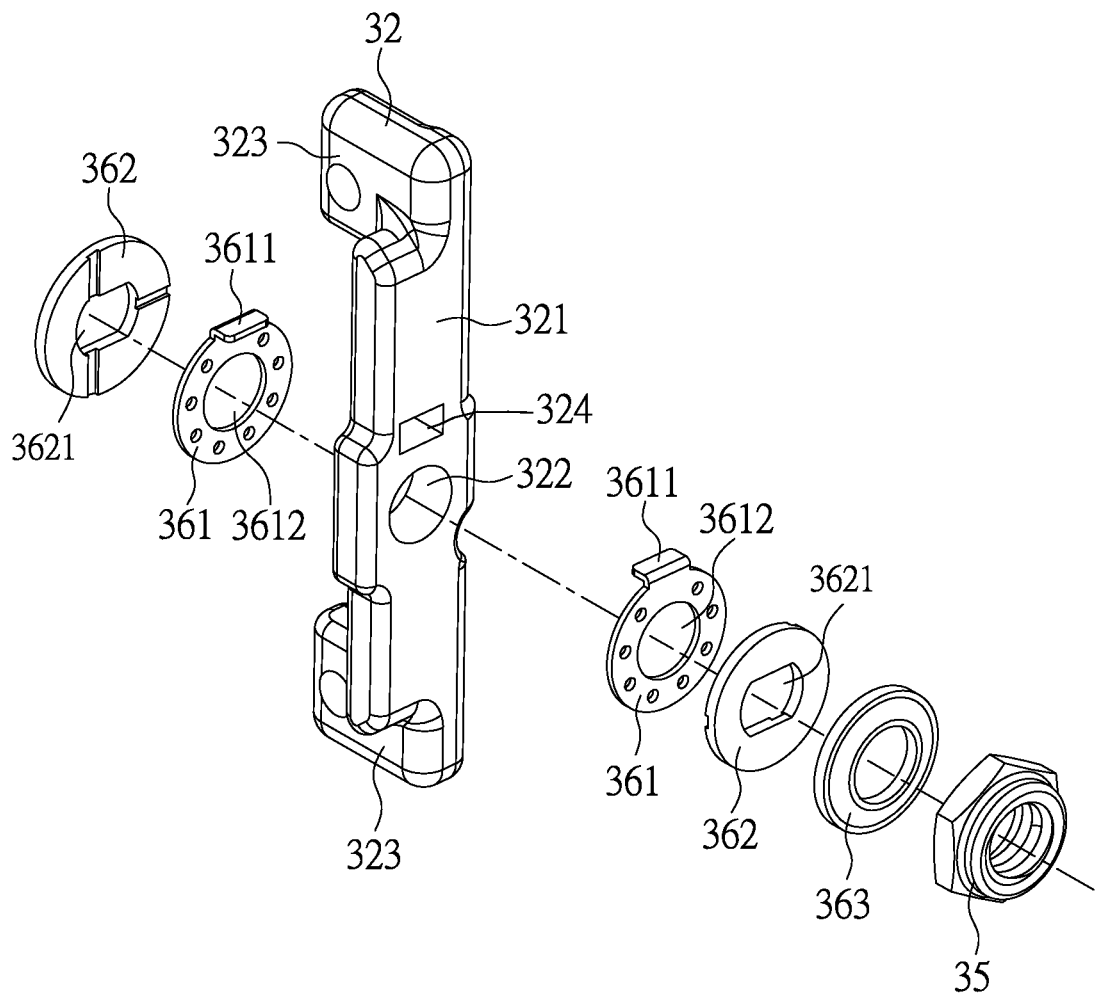
FIG. 3 is an exploded perspective view showing a portion of the adjustable supporting frame of one embodiment of the present invention.

Please refer to the explosive perspective view of FIG. 3, wherein each of the gasket sets 36 includes two hook gaskets 361, two friction gaskets 362, and a cushion gasket 362. Wherein, the hook gaskets 361 are disposed on two sides of the pivoting elements 32. Each of the hook gaskets 361 has a hook 3611 and a through-hole 3612, wherein the hook 3611 is correspondingly engaged to a trench 324 of the pivoting element 32. The through-hole 3612 is a round hole so that the hook gaskets 361 may be actuated by the pivoting elements 32 to rotate with respect to the connecting shaft 31. The friction gaskets 362 are disposed on the sides of the hook gaskets 361 opposite to the pivoting element 32 and contact with the hook gaskets 361. The outer contour of through-holes 3621 of the friction gaskets 362 is the same as the cross-section of the connecting shaft 31; therefore, the friction gaskets 362 are not rotatable with respect to the connecting shaft 31. The friction gaskets 362 adjacent to the large-diameter segment 311 are abut against the abutting parts 313. Besides, the cushion gaskets 362 are disposed between the screw nuts 35 and the friction gaskets 362. Accordingly, when adjusting the tilt angle of the display 2000, the hook gaskets 361 are actuated by the pivoting elements 32 to pivotally rotate with respect to the connecting shaft 31. Thus, a dynamic friction is generated from the friction between the hook gaskets 361 and the static friction gaskets 362 to stabilize the display 2000 during the adjustment process. When the pivoting elements 32 are static, a static friction generated by the gasket sets 36 and a torsional force generated by the torsional springs 34 are balanced with the weight of the display 2000 so that the display 2000 may stop at any tilt angles. Furthermore, the friction (dynamic friction or static friction) determined by the level of close fit between the friction gaskets 362 and the hook gaskets 361 may be adjusted through changing the position of the screw nuts 35. The level of close fit between the friction gaskets 362 and the hook gaskets 361 may be decided according to the weight of the display 2000 and the user's requirement of the hand feeling.

In addition, the back cover 37 is connected to one side of the fixing plate 33 adjacent to the upright 2. The back cover 37 has a via hole 371 which is passed through by the extension element 22 of the upright 2.

Figure 4:
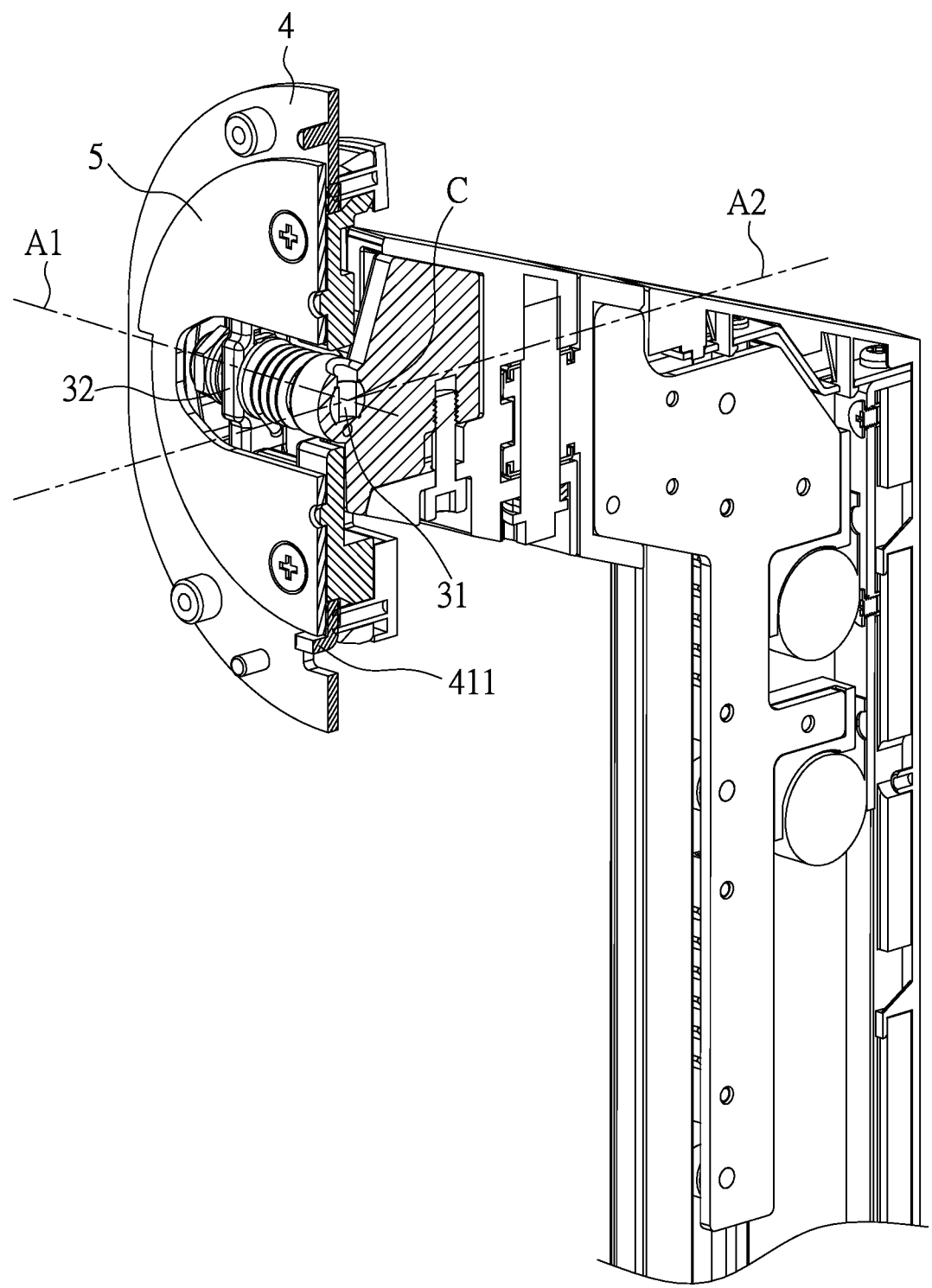
FIG. 4 is a cross-sectional perspective view showing the adjustable supporting frame of one embodiment of the present invention.

The rotating unit 4 includes a rotating plate 41, an engaging hole 42, a first rubbing ring 43, and a second rubbing ring 44. The engaging hole 42 is a round hole that formed on the rotating plate 41. The rotating plate 41 has a protrusion 411 extending toward the display 2000, adjacent to the engaging hole 42, and located directly under the engaging hole 42. The engaging hole 42 is engaged with the outer surface 33111 of the convex part 3311. Therefore, the rotating plate 41 may be set on the convex part 3311 through the engaging hole 42 and rotates about a virtual axis A2 with respect to the fixing plate 33. As shown in FIG. 4, the virtual axis A2 passes through a center of the engaging hole 42 and the accommodating space 332, and is vertical to the fixing plate 33 and the rotating plate 41.

The first rubbing ring 43 is disposed between the rotating plate 41 and the fixing plate 33, and is set on the outer surface 33111 of the convex part 3311. The second rubbing ring 44 is disposed between the rotating plate 41 and the limiting plate 5. The first rubbing ring 43 and the second rubbing ring 44 are able to reduce the abrasion between the rotating plate 41 and the fixing plate 33 and between the rotating plate 41 and the limiting plate 5 respectively.

The limiting plate 5 is disposed on a surface of the rotating plate 4 facing the display 2000. The limiting plate 5 includes two limiting bumps 51 and an opening 52. The limiting bumps 51 are symmetrically formed with respect to the virtual axis A2. The limiting bumps 51 is fixed to the fixing plate 33 while the rotating plate 41 is sandwiched between the fixing plate 33 and the limiting plate 5 and may rotate about the virtual axis A2 with respect to the fixing plate 33 and the limiting plate 5 (the fixing plate 33 and the limiting plate 5 are static). When the rotating plate 41 rotates until one of the limiting bumps 51 abuts against the protrusion 411, the rotating plate 41 is stopped by the limiting bump 51. The opening 52 is aligned with the connecting shaft 31 and accommodates portions of the elements being set on the connecting shaft 31 that protrude out from the accommodating space 332.

Figure 5:
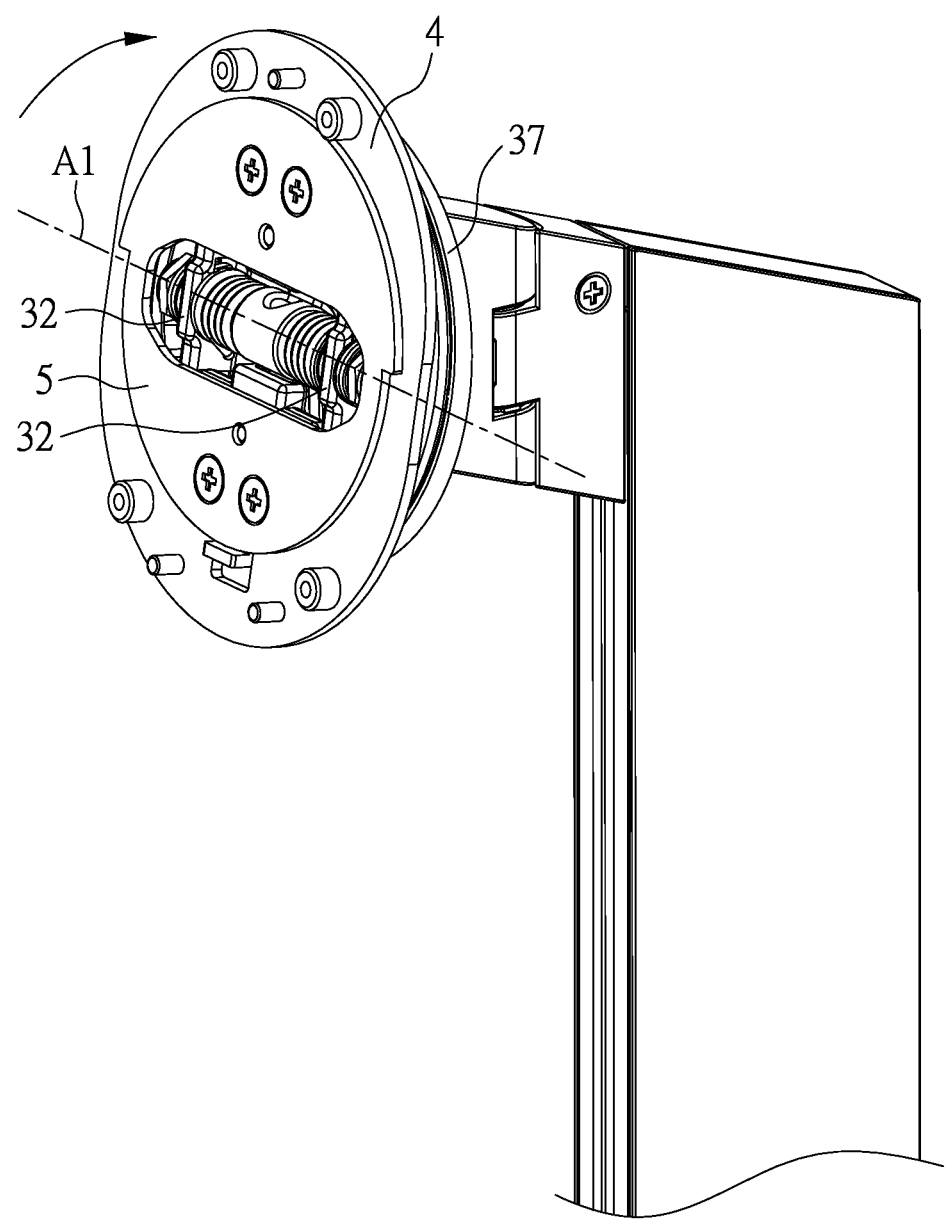
FIG. 5 is an operational perspective view showing the adjustable supporting frame of one embodiment of the present invention.
Figure 6:
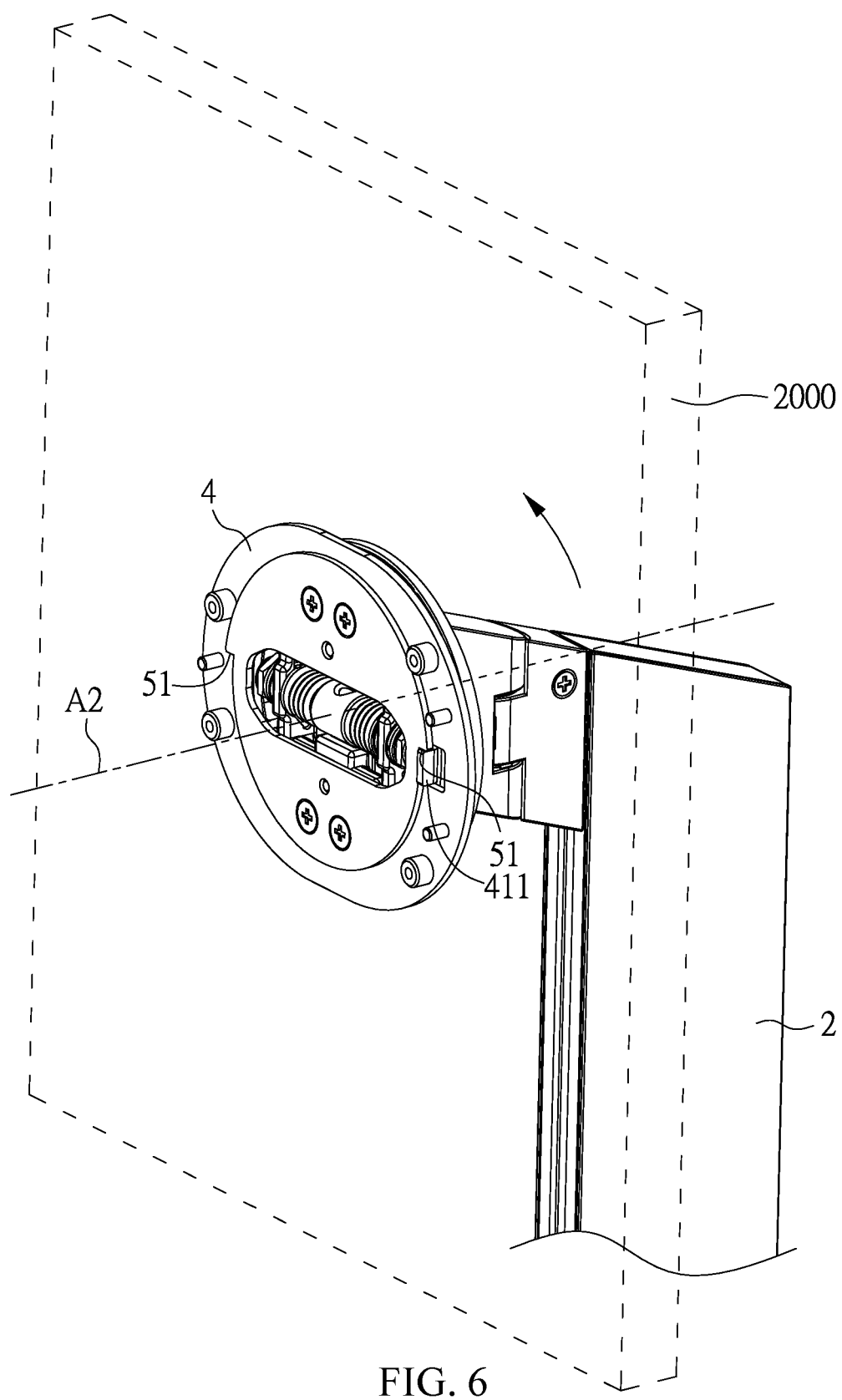
FIG. 6 is an operational perspective view showing the adjustable supporting frame of one embodiment of the present invention.

Please refer to FIG. 5, when a force is applied to the display 2000 to adjust the tilt angle (a tilt view angle with respect to the working surface) of the display 2000, the pivoting elements 32, the fixing plate 33, the back cover 37, the rotating unit 4, and the limiting plate 5 move together with the display 2000 and pivotally rotate about the axis line A1 of the connecting shaft 31. The display 2000 can be stopped at any tilt angle when the force is removed. When a force is applied to the display 2000 (FIG. 1) in the landscape position for vertically rotating the display 2000 with respect to the working surface, the rotating plate 41 connected to the display 2000 rotates about the virtual axis A2 with respect to the outer surface 33111 of the convex part 3311. The display 2000 is converted to a portrait position (FIG. 6) when the protrusion 411 abuts against one of the limiting bumps 51. Accordingly, the display 2000 may be transformed between the portrait position and the landscape position, or stop at any position between the portrait position and the landscape position. Please refer to FIG. 4, in the present embodiment, the axis line A1 of the connecting shaft 31 and the virtual axis A2 intersect at one point, and a rotation center C of the rotating plate 41 is located on the axis line A1.

Figure 7:
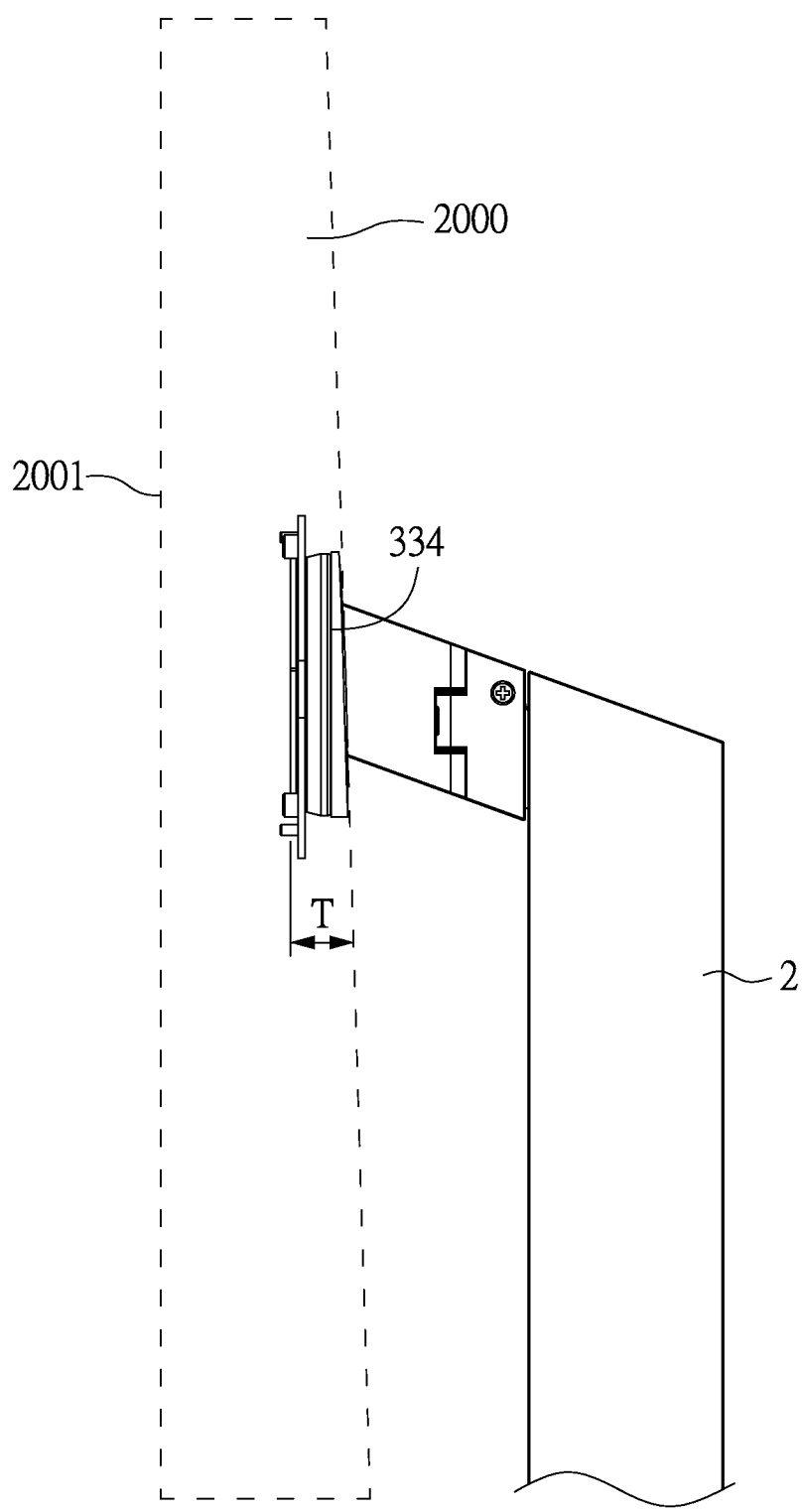
FIG. 7 is a side view showing the adjustable supporting frame of one embodiment of the present invention.

The rotating unit 4 of the present embodiment does not need an actual rotating axis; therefore, the rotating unit 4 does not need extra space for accommodating an actual axis but to directly be set on the fixing plate 33 of the tilting unit 3. The thickness and size of the mechanism can be significantly reduced. As shown in FIG. 7, an integral thickness T of the tilting unit 3, the rotating unit 4, and the limiting plate 5 is substantially 14 mm.

In other embodiment of the present invention, at least a portion of the connecting shaft 31 may be located between the second surface 334 and a display surface 2001 of the display 2000, that is, the connecting shaft 31 is not necessarily entirely disposed in the accommodating space 332 of the fixing plate 33. The connecting shaft 31 can be partially disposed in or pass through the accommodating space 332 and protrude out from the rotating plate 41, or can be partially disposed in the accommodating space 332 and slightly protrude out from the second surface 334. The location of the connecting shaft 31 is not particularly limited thereto, as long as at least a portion of the connecting shaft 31 is located between the second surface 334 and the display surface 2001 of the display 2000.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An adjustable supporting stand for supporting a display disposed on a working surface and having a display surface, the supporting stand comprising:
   a base;
   an upright including a main column and an extension element and being disposed on the base;
   a tilting unit being disposed on the extension element and including a connecting shaft, at least one pivoting element, and a fixing plate, wherein the connecting shaft is connected to the extension element, the at least one pivoting element is rotatably connected to the connecting shaft, and the fixing plate is connected to the at least one pivoting element, the at least one pivoting element and the fixing plate pivotally rotate about an axial line of the connecting shaft; and
   a rotating unit being rotatably disposed on the fixing plate and including a rotating plate and an engaging hole, wherein the engaging hole is formed on the rotating plate, the rotating plate is rotatably engaged to the fixing plate via the engaging hole, and the rotating plate rotates about a virtual axis, wherein the display is disposed on the rotating plate so that the display is convertible between a landscape position and a portrait position;
   wherein the display rotates about the axial line for adjusting a tilt angle of the display with respect to the working surface, the fixing plate includes a first surface facing the display and a second surface facing the main column and opposite to the first surface, and at least a portion of the connecting shaft is located between the second surface and the first surface of the fixing plate.

2. The adjustable supporting frame as claimed in claim 1, wherein the fixing plate includes a main body and an accommodating space, wherein the accommodating space is formed in the main body and penetrates through the main body, the extension element is set on the connecting shaft and passes through the accommodating space, and at least a portion of the at least one pivoting element is disposed in the accommodating space.

3. The adjustable supporting frame as claimed in claim 2, wherein the main body further has a convex part, wherein an outer surface of the convex part is engaged to the engaging hole, the rotating plate is rotatably set on the convex part via the engaging hole, and the virtual axis passes through the accommodating space.

4. The adjustable supporting frame as claimed in claim 3, wherein the outer surface of the convex part is substantially a circular shape and the engaging hole is a round hole, wherein the virtual axis passes through a center of the engaging hole.

5. The adjustable supporting frame as claimed in claim 4, wherein the rotating unit further comprises a first rubbing ring, wherein the first rubbing ring is disposed between the rotating plate and the fixing plate and is set on the outer surface of the convex part.

6. The adjustable supporting frame as claimed in claim 5, wherein each of the at least one pivoting element comprises a subject body, a pivot hole, and at least one locking part, wherein the pivot hole is formed on the subject body and is passed through by the connecting shaft, the at least one locking part is formed on at least one of two ends of the subject body and fixed to the fixing plate so that the fixing plate pivotally rotates with respect to the connecting shaft via the at least one pivoting element.

7. The adjustable supporting frame as claimed in claim 6, wherein the at least one locking part of each of the at least one pivoting element is accommodated in the accommodating space and is fixed to one side of the convex part adjacent to the upright.

8. The adjustable supporting frame as claimed in claim 7, further comprising a limiting plate being disposed on the rotating plate and fixed to the fixing plate, wherein the limiting plate includes at least one limiting bump, the rotating plate is disposed between the limiting plate and the fixing plate and rotates with respect to the limiting plate and the fixing plate, and the rotating plate further includes a protrusion, wherein the rotating plate is stopped when the protrusion abuts against the at least one limiting bump during the rotation process.

9. The adjustable supporting frame as claimed in claim 8, wherein the number of the at least one limiting bump is two, and the limiting bumps are disposed symmetrically with respect to the virtual axis.

10. The adjustable supporting frame as claimed in claim 9, wherein the rotating unit further includes a second rubbing ring, which is disposed between the rotating plate and the limiting plate.

11. The adjustable supporting frame as claimed in claim 10, wherein the tilting unit further includes at least one torsional spring, at least one screw nut, and at least one gasket set, the at least one torsional spring is set on the connecting shaft with one end fixed to the extension part and the other end fixed to the at least one pivoting element, the at least one screw nut is disposed on at least one end of the connecting shaft, while the at least one gasket set is disposed between the at least one torsional spring and the at least one pivoting element and between the at least one pivoting element and the at least one screw nut.

12. The adjustable supporting frame as claimed in claim 11, wherein each of the at least one gasket set includes a cushion gasket, at least one friction gasket, and two hook gaskets, wherein the hook gaskets are disposed on two sides of the at least one pivoting element and pivotally rotate with respect to the connecting shaft along with the at least one pivoting element, the at least one friction gasket is disposed between the hook gasket and the at least one torsional spring and fixed to the connecting shaft, and the cushion gasket is disposed between the hook gasket and the at least one screw nut.

13. The adjustable supporting frame as claimed in claim 12, wherein the connecting shaft has two arc sections and two straight sections on a cross-section in a radial direction, wherein the straight sections are located between the arc sections, the pivot hole of the at least one pivoting element is circular and the extension part of the upright has a mounting hole, wherein a cross-sectional shape of the mounting hole is the same as a cross-sectional shape of the connecting shaft in the radial direction, so that the at least one pivoting element pivotally rotates with respect to the connecting shaft and the connecting shaft is stationary with respect to the extension part when the fixing plate rotates about the axial line.

14. The adjustable supporting frame as claimed in claim 2, wherein the connecting shaft and the at least one pivoting element are disposed in the accommodating space.

15. The adjustable supporting frame as claimed in claim 14, wherein the virtual axis and the axial line of the connecting shaft intersect at a point.

16. The adjustable supporting frame as claimed in claim 15, wherein a rotation center of the rotating plate is located on the axial line of the connecting shaft.

17. The adjustable supporting frame as claimed in claim 14, wherein the tilting unit further includes a back cover being connected to one side of the fixing plate adjacent to the upright, wherein the back cover has a via hole which is passed through by the upright.

18. The adjustable supporting frame as claimed in claim 14, wherein an integral thickness of the tilting unit, the rotating unit, and the limiting plate is substantially 10 mm to 15 mm.

* * * * *